(12) United States Patent
Bulin

(10) Patent No.: US 8,516,792 B2
(45) Date of Patent: Aug. 27, 2013

(54) SYSTEM FOR MANAGING THE HEAT FLUXES OF AN AIRCRAFT

(75) Inventor: Guillaume Bulin, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 1007 days.

(21) Appl. No.: 12/565,930

(22) Filed: Sep. 24, 2009

(65) Prior Publication Data

US 2010/0071638 A1 Mar. 25, 2010

(30) Foreign Application Priority Data

Sep. 25, 2008 (FR) ...................................... 08 56459

(51) Int. Cl.
*F02K 99/00* (2009.01)

(52) U.S. Cl.
USPC ................... 60/266; 62/87; 60/39.83; 60/772

(58) Field of Classification Search
USPC ...................... 60/266, 267, 39.83; 62/87, 402
See application file for complete search history.

(56) References Cited

U.S. PATENT DOCUMENTS

| 2,364,458 | A | | 12/1944 | McCollum | |
|---|---|---|---|---|---|
| 3,080,716 | A | * | 3/1963 | Cummings et al. | 60/736 |
| 3,733,816 | A | * | 5/1973 | Nash et al. | 60/39.281 |
| 3,779,007 | A | * | 12/1973 | Lavash | 60/39.281 |
| 4,104,873 | A | * | 8/1978 | Coffinberry | 60/39.281 |
| 4,263,786 | A | | 4/1981 | Eng | |
| 4,773,212 | A | * | 9/1988 | Griffin et al. | 60/772 |
| 5,105,875 | A | * | 4/1992 | McArthur | 165/41 |
| 5,414,992 | A | * | 5/1995 | Glickstein | 60/782 |
| 6,257,003 | B1 | * | 7/2001 | Hipsky | 62/88 |
| 6,434,968 | B2 | | 8/2002 | Buchholz et al. | |
| 6,729,156 | B2 | | 5/2004 | Sauterleute et al. | |
| 8,250,852 | B2 | * | 8/2012 | Porte et al. | 60/226.1 |
| 2010/0212857 | A1 | * | 8/2010 | Bulin et al. | 165/41 |
| 2010/0288244 | A1 | * | 11/2010 | Bulin et al. | 123/557 |
| 2011/0252764 | A1 | * | 10/2011 | Smith | 60/39.83 |

FOREIGN PATENT DOCUMENTS

| DE | 101 19 433 C1 | 8/2002 |
|---|---|---|
| EP | 1 138 592 A1 | 10/2001 |
| EP | 1 790 568 A2 | 5/2007 |
| FR | 1376252 A | 10/1964 |
| JP | 2000-146357 A | 5/2000 |

OTHER PUBLICATIONS

French Search Report dated May 20, 2009.

* cited by examiner

*Primary Examiner* — William H Rodriguez
(74) *Attorney, Agent, or Firm* — Young & Thompson

(57) ABSTRACT

A system for managing heat fluxes of an aircraft is provided, including a fuel tank supplying a turbomachine with fuel via a fuel supply circuit; a cell cooling circuit connected to a thermal effluents source, which integrates a first heat exchanger ensuring heat transfer between a coolant circulating in the cell cooling circuit and air flow channeled into a cooling air channel extending from an air intake to an exhaust; and a second heat exchanger ensuring a heat transfer between the coolant circulating in the cell cooling circuit and the fuel. The air intake includes a blocker to open/close it. The system includes a fuel transfer circuit, which connects the fuel tank to the second heat exchanger and provides fuel to the second heat exchanger, including a valve selectively changing a fuel supply direction from the second heat exchanger between the directions of the tank and the fuel supply circuit.

13 Claims, 3 Drawing Sheets

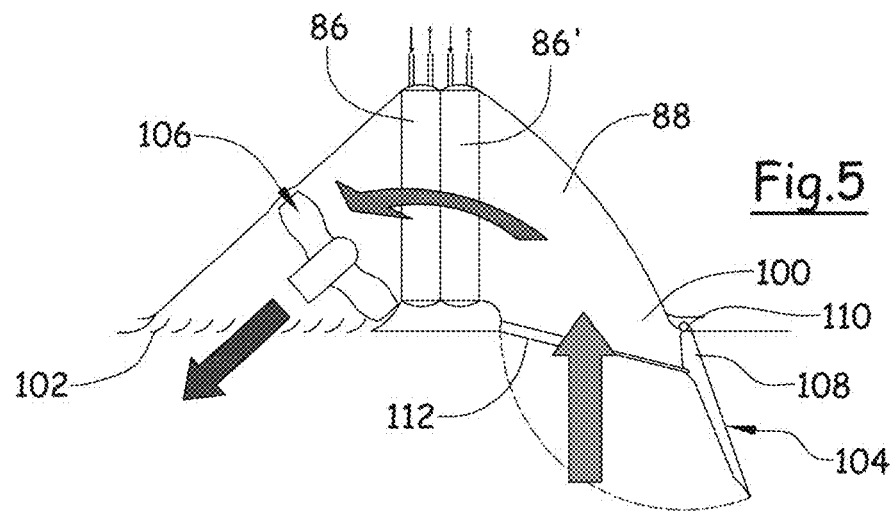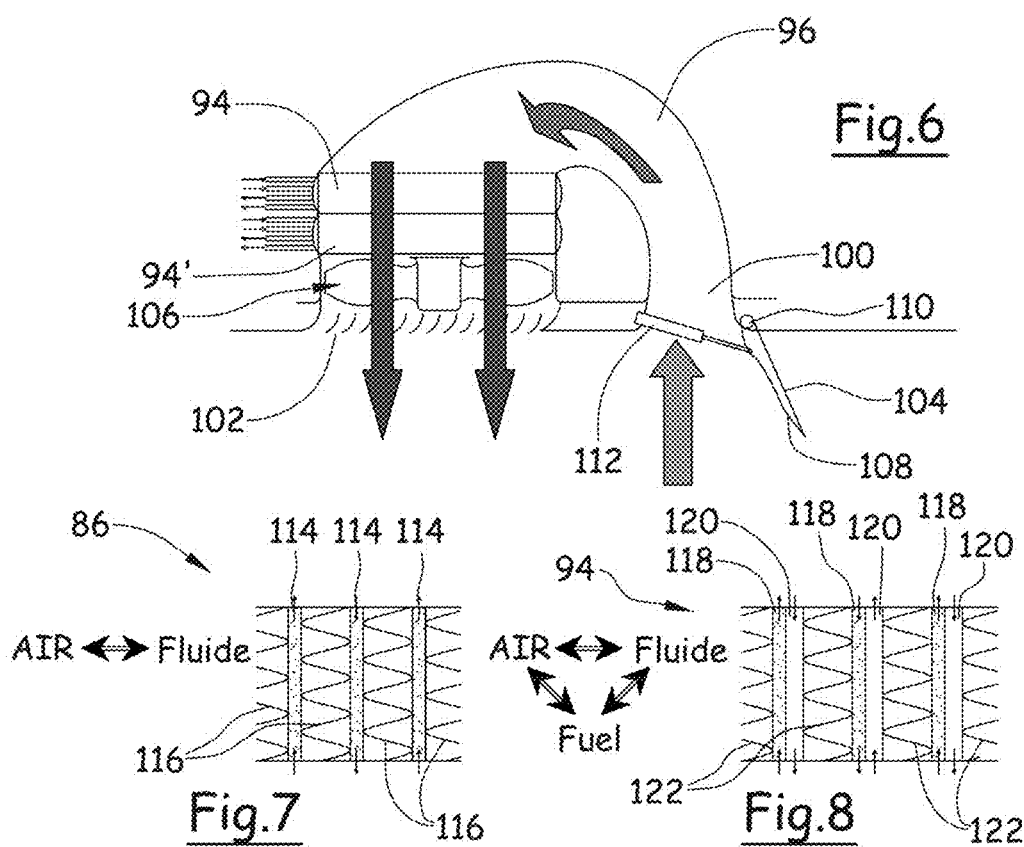

SYSTEM FOR MANAGING THE HEAT FLUXES OF AN AIRCRAFT

BACKGROUND OF THE INVENTION

1. Field of the Invention

This invention relates to a system for managing heat fluxes of an aircraft.

2. Description of the Related Art

An aircraft comprises a cell and at least one propulsion system. In FIGS. 1 and 2, a cell was shown diagrammatically at 10 and a propulsion system was shown diagrammatically at 12.

According to a widely used embodiment, a propulsion system is suspended under a wing by means of a mast. More generally, the propulsion system is connected to the cell by means of an interface 14 that is embodied by dotted lines in FIGS. 1 and 2.

A propulsion system 12 comprises a turbomachine 16 that is equipped with a first engine cooling circuit 18, in which a coolant, in particular oil, circulates.

The turbomachine is supplied with fuel by means of a fuel circuit 20 that extends from a tank 22 that is arranged at the cell. As illustrated in FIG. 1, it is possible to use several cooling sources to cool the oil of the turbomachine, for example by using at least one oil/fuel exchanger 24 at the first engine cooling circuit 18, and to use the fuel as coolant so as to cool the oil of the turbomachine. In this case, a recirculation circuit 26 is provided so as to reintroduce the fuel that is heated in the tank 22. In addition, the propulsion system 12 can comprise another source 28 of thermal effluents, for example one or more electric generators installed close to the turbomachine.

So as to optimize the operation of these elements 28, it is necessary to regulate their temperatures by means of a second engine cooling circuit 30, in which a coolant that passes through a third engine exchanger 32, in particular an oil/fuel exchanger according to FIG. 1, circulates.

The characteristics of each engine cooling circuit, namely the characteristics of the fluid to be cooled, for example its flow rate, the characteristics of the exchanger, for example its dimensions, the characteristics of the fluid that is used for cooling, for example its flow rate, are adjusted based on the requirements for regulation of the temperature at the source, in particular so as to keep the temperature of the source below a certain threshold.

In the case of the first engine cooling circuit, these requirements vary according to the operation of the aircraft and are more significant when the aircraft is on the ground to the extent where the outside air can be at a high temperature and there is no air flow linked to the movement of the aircraft.

Thus, the characteristics of the engine cooling circuit relative to the turbomachine are generally determined based on the most significant constraints when the aircraft is on the ground.

The cell 10 also comprises at least one source of thermal effluents 34 and in general several sources 34, 34', for example electrical accessories, electronic power systems, an air-conditioning system, avionics, and client equipment. All of these elements are to be temperature-regulated to ensure their operation and to guarantee the highest availability rate. For this purpose, at least one cell cooling circuit 36 is provided. According to the illustrated example, the cell comprises two cell cooling circuits 36, 36', each comprising an exchanger 38, 38' that makes it possible to cool the coolant that circulates in each of the circuits.

According to an embodiment that is illustrated in FIG. 1, the exchangers 38, 38' are arranged in at least one cooling air channel 40 that is arranged in the lower portion of the fuselage and that comprises—upstream—one or more air intakes 42, preferably of the dynamic type, and—downstream—one or more exhausts 44.

The cooling air channels 40 operate according to two primary methods:

The first mode of operation takes place on the ground when the aircraft is immobile or moves at reduced speeds. In these cases, the natural air flow within said cooling air channels 40 is generally very low and is to be forced using in particular an electric fan 46 to allow the evacuation of the heat fluxes.

The second mode of operation takes place in flight when the aircraft moves at high speeds in a cold atmosphere. In this case, the dynamic pressure at the air intakes is significant, and the ambient temperature is relatively low; the effectiveness of the exchanges is very significant, so that it is necessary to limit the flow rate of air circulating in the cooling air channels to not over-cool the thermal effluent sources.

In all of the cases, the air intakes are never blocked because the cooling air requirements always exist regardless of the mode of operation. To the extent that the air intakes always interfere with the aerodynamic flow, the cooling air channels prove to be detrimental in terms of aerodynamic drag for the aircraft and therefore in terms of energy consumption of the propulsion systems.

According to a first variant, the cooling air channels have set dimensions and are consequently simple, light and reliable. However, whereby their dimensions are calculated based on the most significant requirements, their impact on the aerodynamic drag, and therefore on the consumption of the aircraft, is significant during the high-speed flight phases, whereas the requirements are normally low for these flight phases.

According to another variant, the cooling air channels have a variable geometry to adapt their dimensions based on requirements, but in this case, the channels prove complex, heavy, and not very reliable.

As illustrated in FIG. 1, for the cooling systems that are implanted in propulsion systems, the fuel tanks 22 can constitute heat sinks. Actually, it is known to one skilled in the art that even when the fuel level is at its lowest, the tanks have intrinsic capacities for absorbing the thermal effluents.

So as to eliminate the drawbacks linked to the cooling air channels, according to another variant illustrated in FIG. 2, the exchangers 38, 38' are not placed in a cooling air channel but ensure a heat transfer between the coolant of the cell cooling circuit(s) 36, 36' and the fuel for conveying the heat fluxes in the direction of the tanks. For this purpose, at least one circuit 48 is provided between the tank(s) 22 and the exchanger(s) 38, 38'.

This relatively simple solution makes it possible to eliminate the cooling air channels and consequently is not detrimental in terms of aerodynamic drag and therefore energy consumption.

However, this solution is not completely satisfactory because its operating period is limited to the extent where it is no longer possible to dissipate the heat in the tanks when the fuel temperature reaches a certain threshold linked to the fuel temperature that is accepted by the turbomachines or to the risks of inflammability of the tank.

Consequently, when this threshold is reached, the capacities for heat dissipation are low, so that it is necessary to operate certain sources of thermal effluents in degraded mode; this is, for example, the case of the air-conditioning systems of the cell at the end of the flight.

According to other constraints, in terms of aircraft design, the components of the cell and the components of the propulsion systems are segregated for safety reasons. Actually, it is necessary to ensure that a breakdown that appears at the cell and disrupts the operation of the propulsion systems is extremely improbable.

BRIEF SUMMARY OF THE INVENTION

Also, the purpose of this invention is to eliminate the drawbacks of the prior art by proposing a system for managing the heat fluxes of an aircraft that limits the impact on the aerodynamic drag and therefore on the energy consumption of the aircraft, there being no limit on the operating period.

According to another objective, the system for managing the heat fluxes is to preserve the cell/propulsion system segregation.

For this purpose, the invention has as its object a system for managing the heat fluxes of an aircraft comprising at least one propulsion system that integrates a turbomachine and a cell that comprises, on the one hand, at least one fuel tank so as to supply the turbomachine via a fuel supply circuit, and, on the other hand, at least one source of thermal effluents connected to a cell cooling circuit that integrates first means for ensuring a heat transfer between a coolant that circulates in said cell cooling circuit and an air flow that is channeled into at least one cooling air channel that extends from at least one air intake up to at least one air exhaust, whereby said system comprises second means for ensuring a heat transfer between a coolant that circulates in said cell cooling circuit and the fuel, a fuel circuit that connects said at least one tank to said second heat transfer means, whereby the air intake comprises blocking means that can occupy a first open state in which they allow air to pass inside the channel and a second closed state in which they block the air intake, characterized in that the fuel circuit comprises at least one control valve that orients the fuel either in the direction of the tank or in the direction of the circuit designed for the propulsion system.

BRIEF DESCRIPTION OF THE DRAWINGS

Other characteristics and advantages will emerge from the following description of the invention, a description that is provided only by way of example, with regard to the accompanying drawings, in which:

FIG. 5 is a cutaway illustrating a cooling air channel that integrates two double-flux exchangers according to a first embodiment of the invention, FIG. 6 is a cutaway that illustrates a cooling air channel that integrates two triple-flux exchangers according to another embodiment of the invention, FIG. 7 is a cutaway of a double-flux exchanger, and FIG. 8 is a cutaway of a triple-flux exchanger.

DETAILED DESCRIPTION OF THE PREFERRED EMBODIMENTS

Figure 3:
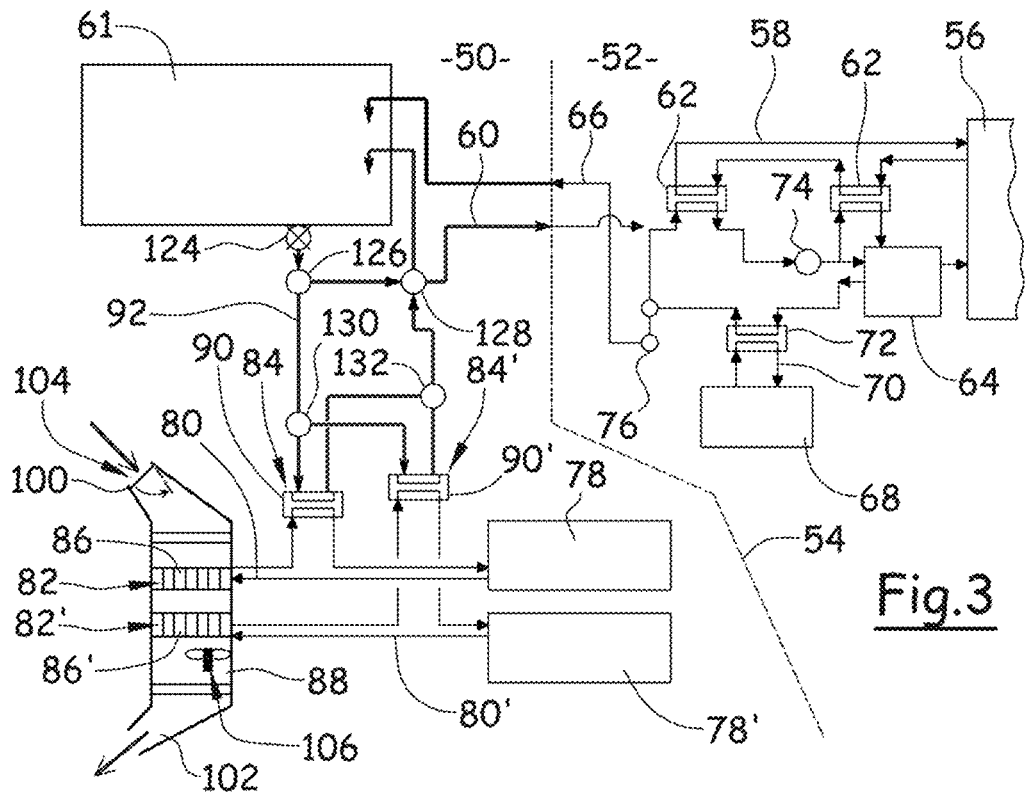
FIG. 3 is a diagram that illustrates a first variant of a system for managing the heat fluxes of an aircraft according to the invention.
Figure 4:
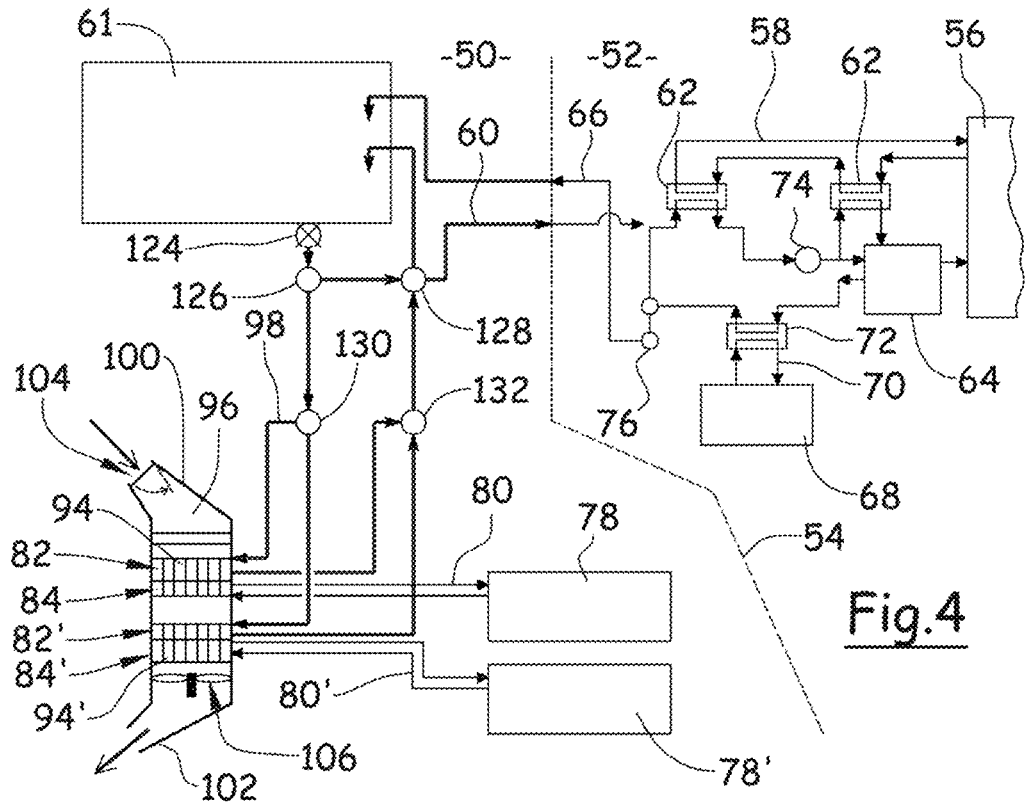
FIG. 4 is a diagram that illustrates another variant of a system for managing the heat fluxes of an aircraft according to the invention.

FIGS. 3 and 4 diagrammatically show an aircraft with a cell 50 and at least one propulsion system 52.

Cell is broadly defined as all of the elements of the aircraft, in particular the fuselage, the wings, and the tail assemblies, with the exception of the propulsion systems.

According to a widely used embodiment, a propulsion system is suspended under a wing by means of a mast. More generally, the propulsion system is connected to the cell by means of an interface 54 that is embodied by dotted lines in FIGS. 3 and 4.

A propulsion system 52 comprises a turbomachine 56 that is equipped with a first engine cooling circuit 58, in which a coolant, in particular oil, circulates.

The turbomachine 56 is supplied with fuel by means of a fuel supply circuit 60 that extends from at least one tank 61 that is arranged at the cell.

To ensure the cooling of the coolant of the engine cooling circuit 58, said circuit 58 comprises at least one first engine exchanger 62. According to an embodiment that is illustrated in FIGS. 3 and 4, the exchanger(s) 62 ensure(s) a heat transfer between the coolant that circulates in the cooling circuit 58 of the engine and the fuel.

When the fuel is used as a vector to transfer heat, means 64 are provided upstream from the turbomachine 56 to regulate the fuel that is injected into the turbomachine 56 as well as a return circuit 66 of the fuel in the direction of the tank 61. This regulation and this return circuit are necessary when, for example, the quantity of fuel to ensure adequate cooling is more than the quantity of fuel injected into the turbomachine.

In addition, the propulsion system 52 can comprise another source 68 of thermal effluents, for example one or more electric generators installed close to the turbomachine.

So as to optimize the operation of these sources 68, it is necessary to regulate their temperatures by means of a second engine cooling circuit 70, in which a coolant that passes through at least one second engine exchanger 72 circulates.

According to an embodiment that is illustrated in FIGS. 3 and 4, the exchanger(s) 72 ensure(s) a heat transfer between the coolant that circulates in the cooling circuit 70 of the engine and the fuel.

In addition, at the propulsion system 52, the fuel circuit 60, 66 can comprise at least one pump 74, at least one recirculation valve 76 to manage the fuel flux between the tanks, the turbomachines 56, and the different exchangers 62, 72.

The invention is not limited to the embodiment that is shown in FIGS. 3 and 4 that relates to the portion of the system for managing the heat fluxes that is integrated in the propulsion system. Thus, the fuel circuit 60 can be simplified and can comprise only one connection between a tank and a turbomachine. In the same way, the exchangers 62 and 72 can use air to evacuate the heat instead of fuel, whereby these exchangers comprise at least one surface that is in contact with the aerodynamic fluxes so as to reduce the impact on the drag.

The cell 50 also comprises at least one source of thermal effluents 78, and generally several sources 78, 78', for example electrical accessories, electronic power systems, an air-conditioning system, avionics, and client equipment. All of these elements are to be temperature-regulated to ensure their operation and to guarantee the highest availability rate. For this purpose, at least one cell cooling circuit 80 is provided. According to the illustrated example, the cell 50 comprises two cell cooling circuits 80, 80', one for each source of thermal effluents.

According to the invention, the cell cooling circuit 80 comprises first means 82 for ensuring a heat transfer between the coolant that circulates in said circuit 80 and the air, as well as second means 84 for ensuring a heat transfer between the coolant that circulates in said circuit 80 and the fuel.

According to an embodiment that is illustrated in FIG. 3, the cell cooling circuit 80 comprises a first fluid/air exchanger 86 that is arranged in a cooling air channel 88 as well as a second fluid/fuel exchanger 90 that is distant and different from the first exchanger 86, a circuit 92 that ensures the supply of said second exchanger 90 with fuel, whereby the latter is either reinjected in the tank 61 or oriented toward the circuit 60 that is designed for a propulsion system 52. According to this variant, the exchangers 86 and 90 are of the double-flux type.

According to another embodiment that is illustrated in FIG. 4, the cell cooling circuit 80 comprises a single fuel/fluid/air exchanger 94 that is arranged in a cooling air channel 96, a circuit 98 ensuring the supply of said exchanger 90 with fuel, whereby the latter is either reinjected into the tank 61 or oriented toward the circuit 60 that is designed for a propulsion system 52. According to this variant, the exchanger 94 is of the triple-flux type.

Preferably, to preserve the principle of segregation of the elements, each source of thermal effluents 78, 78' comprises a cooling circuit 80, 80' that is specific thereto, whereby each circuit 80, 80' comprises either two double-flux exchangers 86 and 90, respectively 86' and 90', or is a triple-flux exchanger 94, or 94'.

Preferably, the exchangers 86, 86' (or 94, 94') are arranged in a single cooling air channel 88 (or 96). As a variant, the exchangers each use a cooling air channel that is specific thereto.

The cooling air channel 88 or 96 extends from at least one air intake 100 and at least one air exhaust 102.

According to an important characteristic of the invention, the air intake 100 comprises blocking means 104 that can occupy a first open state (in dotted lines in FIGS. 3 and 4), in which they allow the air to pass inside the channel and a second closed state (in heavy lines in FIGS. 3 and 4), in which they block the air intake so as to minimize the impact of said intake on the aerodynamic drag.

Preferably, means 106 are provided to force the air flow into the cooling air channel, for example a fan.

According to an embodiment that is illustrated in FIGS. 5 and 6, the air exhaust 102 is of the leveling type and is located at a surface that is in contact with the aerodynamic fluxes flowing outside of the aircraft. Advantageously, the air exhaust 102 comprises a grid that makes it possible to limit the impact of said exhaust on the aerodynamic drag of the aircraft.

According to one embodiment, the air intake 100 is of the leveling type and is located at a surface that is in contact with the aerodynamic fluxes that flow outside of the aircraft. The blocking means 104 come in the form of a door 108 that is connected to the aircraft by means of a hinge 110, whose opening and closing are controlled by an actuator 112, whereby said door is in closed position at a surface that is in contact with the aerodynamic fluxes. Of course, the shapes of the door in closed position as well as those of the hinge 110 are defined so as to reduce the impact on the aerodynamic drag.

As illustrated in FIGS. 5 and 6, the door can open toward the outside so as to project relative to the surface of the aircraft that is in contact with the aerodynamic fluxes. However, as will be explained below, this selection has only a slight influence on energy consumption to the extent where the door is open when the aircraft is revving up or moves at a low speed.

This arrangement with an opening toward the outside makes it possible to limit the space occupied by the cooling air channel, which makes it possible to have a large passage section.

The cooling air channel 88 or 96 can have different shapes. It generally has the shape of a more or less tapered U or V.

The shape of the channel and the arrangement of the exchanger(s) are adapted so as to promote the heat exchanges at the exchanger(s) and to reduce the differential heads. The channel is optimized for the ground phases.

Preferably, the exchangers are arranged perpendicularly to the flow of air circulating in the cooling air channel.

According to a first embodiment, as illustrated in FIG. 5, the cooling air channel 88 has a V shape and comprises two double-flux exchangers 86, 86', coupled, arranged at the point of the V, whereby the fan 106 is inserted between the exchangers 86, 86' and the exhaust 102.

According to another embodiment, as illustrated in FIG. 6, the cooling air channel has a U shape and comprises two coupled triple-flux exchangers 94, 94', arranged at the branch of the U that is connected to the air exhaust 102, whereby the fan 106 is inserted between the exchangers 94, 94' and the exhaust 102.

FIG. 7 shows in section a double-flux plate exchanger 86, which comprises a first series of pipes 114 designed for coolant and connected to the cooling circuit 80, 80', whereby said pipes 114 are kept spaced from one another using separators 116 that allow air to pass.

FIG. 8 shows in section a triple-flux plate exchanger 94 that comprises a first series of pipes 118 that are designed for coolant and connected to the cooling circuit 80, 80', whereby each two are coupled to a pipe 120 of a second series of pipes designed for fuel and connected to the fuel circuit 98, whereby the pairs of pipes 118 and 120 are kept spaced from one another using separators 122 that allow air to pass.

The air/fluid exchangers are optimized for the ground phases whereas the fuel/fluid exchangers are optimized for the flight phases.

According to one embodiment, at the output of the tank 61, the fuel circuit 92 or 98 comprises a pump 124 that is followed by a first control valve 126 that orients the fuel either in the direction of the exchangers 84, 84', 94, 94' of the cell or in the direction of a second control valve 128 that orients the fuel either in the direction of the tank 61 or in the direction of the circuit 60 that is designed for a propulsion system.

Between the first control valve 126 and the exchangers 84, 84', 94, 94', at least one third control valve 130 makes it possible to control the flow rate of the fuel toward each of said exchangers.

At the output of the exchangers 84, 84', 94, 94', at least one fourth control valve 132 is provided to collect the fuel fluxes that come from the exchangers and to orient them toward the second control valve 128.

Other technical solutions can be considered to regulate the fuel fluxes in the direction of the exchangers, of the tank and propulsion systems.

The operation of the system for managing the heat fluxes is now described.

During the ground phases, the cooling air channel(s) 88, 96 are open, and the means 106 for generating an air flow inside the channel are activated. The thermal effluents of the aircraft are thus dissipated in the atmosphere using exchangers 86, 86' or 94, 94'.

The cooling air channel, the exchangers and the means 106 are thus sized for this ground phase and not for the cruising phases. This channel can optionally be activated at low speeds.

Consequently, the design of the cooling air channel and more particularly the air intake is simplified, whereby the air intake does not need to be of the dynamic type to recover the kinetic energy of the incoming air.

Relative to the geometry of the channel, it is no longer optimized based on two different flight regimes, namely at high speed and when revving up. Consequently, the channel does not have variable geometry but rather a stationary geometry adapted to the flight phases when revving up or at low speeds, which makes it possible to obtain a reliable, light and compact channel.

According to another advantage, the positioning of the air intake 100 is no longer dictated by considerations of aerodynamic order but by installation constraints.

During the flight phases, in particular at high speeds, the cooling air channel is closed, so that it does not induce any impact on the aerodynamic drag. In this case, the thermal effluents are dissipated via the fuel in the tank(s) or in the propulsion systems or other elements that are linked to the fuel circuit.

In the case where the thermal effluents are dissipated in the fuel tanks, certain sizing precautions should be taken. However, to the extent that the thermal effluents are dissipated in the fuel during flight phases at high altitudes and at high speeds, the heating of the fuel and therefore of the tank from which the heat exchanges originate is counterbalanced by the cooling of tanks from which aerodynamic fluxes that flow outside of the wings originate.

When the thermal effluents are dissipated in the fuel tanks, there is no limitation on use other than the fuel's heat storage capacity itself and maximum limitations of fuel temperatures in the piping.

During certain flight phases at low speeds for which the heat absorption capacities of the fuel circuit are limited either because the quantity of fuel remaining in the tanks is low or because the turbomachines operate while idling and do not absorb much fuel, the cooling air channel(s) can be open to supplement the cooling capacity. At these speeds, the channels induce only a low impact on the aerodynamic drag. If necessary, the fans can force the flux in the cooling air channels without it being necessary to provide air intakes of the dynamic type.

In the case where the effluents are dissipated in the fuel that supplies the turbomachines, the possible increase of the aerodynamic drag that originates from the air/fluid exchangers will be compensated by the additional thrust that is produced because of the higher temperature of the fuel.

Figure 1:
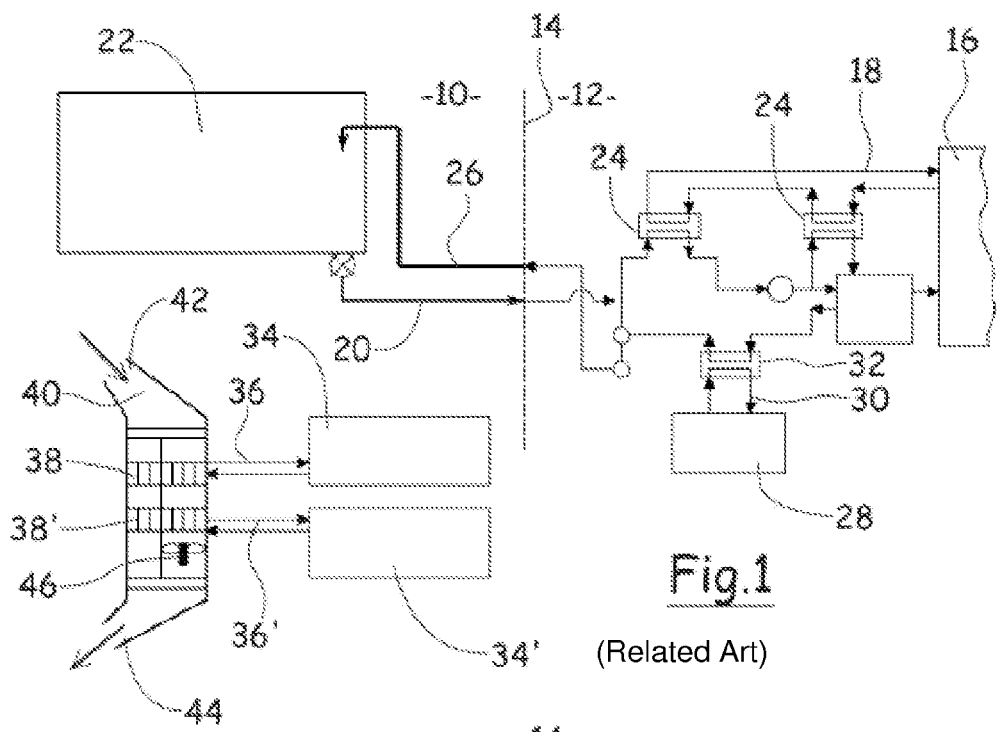
FIG. 1 is a diagram that illustrates a first variant of a system for managing the heat fluxes of an aircraft according to the prior art.
Figure 2:
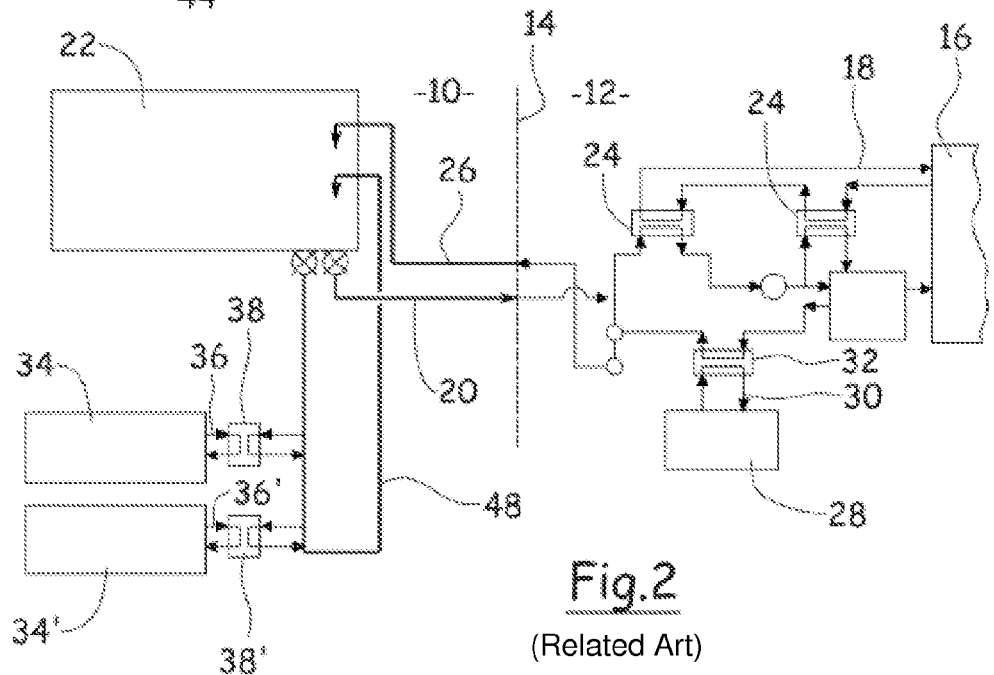
FIG. 2 is a diagram that illustrates a second variant of a system for managing the heat fluxes of an aircraft according to the prior art.

If, upon the departure of the aircraft, the flight personnel see that the dissipation of the thermal effluents via the cooling air channel cannot be used due to a breakdown of the fan, the actuator controlling the opening of the door, the pilot can decide to use the tanks to dissipate the heat. In this case, as for the prior art illustrated in FIG. 2, this configuration has operational limits in terms of operating period. However, it makes it possible for the aircraft to accomplish its mission.

As a variant or in a complementary manner, the pilot can decide to use propulsion systems to dissipate heat. In this case, even if this configuration can have an impact on the sizing of the engine exchangers, it makes it possible for the aircraft to accomplish its mission.

The invention claimed is:

1. A system for managing the heat fluxes of an aircraft that includes at least one propulsion system that integrates a turbomachine, and a cell, the system comprising:
   at least one fuel tank configured to supply the turbomachine with fuel via a fuel supply circuit;
   a cell cooling circuit connected to at least one source of thermal effluents, the cell cooling circuit integrating first means for ensuring a heat transfer between a coolant that circulates in the cell cooling circuit and an air flow that is channeled into at least one cooling air channel that extends from at least one air intake up to at least one air exhaust;
   second means for ensuring a heat transfer between the coolant that circulates in the cell cooling circuit and the fuel; and
   a fuel transfer circuit that connects the at least one fuel tank to the second heat transfer means and that is configured to provide the fuel from the at least one fuel tank to the second heat transfer means, the fuel transfer circuit including at least one control valve configured in the fuel transfer circuit to selectively change a supply direction of the fuel from the second heat transfer means between the direction toward the tank and the direction toward the fuel supply circuit that is designed for the propulsion system,
   wherein the air intake includes means for blocking air configured to occupy a first open state in which the blocking means allows the air flow to pass inside the cooling air channel and a second closed state in which the blocking means blocks the air intake to prohibit the air flow to pass inside the cooling air channel.

2. The system for managing the heat fluxes of an aircraft according to claim 1, wherein the first heat transfer means comprises a first fluid/air exchanger that is arranged in one of the at least one cooling air channel,
   the second heat transfer means comprises a second fluid/fuel exchanger that is distant from the first exchanger,
   the cell cooling circuit comprising
      the first fluid/air exchanger,
      the second fluid/fuel exchanger, and
      a circuit that ensures the supply of said second exchanger with fuel, the fuel being re-injected in the tank or oriented to the supply circuit that is designed for one of the at least one propulsion system.

3. The system for managing the heat fluxes of an aircraft according to claim 1, wherein the first heat transfer means and the second heat transfer means together comprise a single fuel/fluid/air exchanger that is arranged in one of the at least one cooling air channel, the cell cooling circuit comprising the single fuel/fluid/air exchanger,
   wherein the system includes a circuit that ensures the supply of said exchanger with fuel, the fuel being re-injected in the tank or oriented to the supply circuit that is designed for one of the at least one propulsion system.

4. The system for managing the heat fluxes of an aircraft according to claim 1, further comprising means for forcing the flow of air into the cooling air channel.

5. The system for managing the heat fluxes of an aircraft according to claim 1, wherein the blocking means comprises a door that is connected to the aircraft by a hinge, the door being in closed position at a surface that is in contact with aerodynamic fluxes.

6. The system for managing the heat fluxes of an aircraft according to claim 5, wherein the door is configured to open toward the outside of the cooling air channel, the opening being facilitated by the hinge.

7. The system for managing the heat fluxes of an aircraft according to claim 1, wherein the cooling air channel has a V shape and comprises two coupled exchangers, arranged at the point of the V, and the system further comprises a fan inserted between the exchangers and the air exhaust.

8. The system for managing the heat fluxes of an aircraft according to claim 1, wherein the cooling air channel has a U shape and comprises two coupled exchangers, arranged at the branch of the U that is connected to the air exhaust, and the system further comprises a fan is inserted between the exchangers and the air exhaust.

9. The system for managing the heat fluxes of an aircraft according to claim 1, wherein first heat transfer means is sized so as to optimize the operation of the first heat transfer means during the ground phases of the aircraft.

10. The system for managing the heat fluxes of an aircraft according to claim 1, wherein the second heat transfer means is sized so as to optimize the operation of the second heat transfer means during flight phases of the aircraft at high speeds.

11. A method for managing heat fluxes of an aircraft that comprises at least one propulsion system that integrates a turbomachine and a cell that includes at least one fuel tank configured to supply the turbomachine with fuel via a fuel supply circuit and, at least one source of thermal effluents connected to a cell cooling circuit that integrates first means to ensure a heat transfer between a coolant that circulates in the cell cooling circuit and an air flow that is channeled into at least one cooling air channel that extends from at least one air intake up to at least one air exhaust, the method comprising:
during flight phases of the aircraft, blocking the air intake of the cooling air channel to prohibit the air flow to pass inside the cooling air channel and ensuring a heat transfer between a coolant that circulates in the cell cooling circuit and the fuel; and
during ground phases of the aircraft, ensuring a heat transfer between the coolant that circulates in the cell cooling circuit and the air flow.

12. The method for managing heat fluxes of an aircraft according to claim 11, wherein forcing the air flow into the cooling air channel during the ground phases.

13. A system for managing the heat fluxes of an aircraft that includes at least one propulsion system that integrates a turbomachine, and a cell, the system comprising:
at least one fuel tank configured to supply the turbomachine with fuel via a fuel supply circuit;
a cell cooling circuit connected to at least one source of thermal effluents, the cell cooling circuit integrating a first heat exchanger configured to ensure a heat transfer between a coolant that circulates in the cell cooling circuit and an air flow that is channeled into at least one cooling air channel that extends from at least one air intake to at least one air exhaust;
a second heat exchanger configured to ensure a heat transfer between a coolant that circulates in the cell cooling circuit and the fuel; and
a fuel transfer circuit that connects the at least one fuel tank to the second heat exchanger and that is configured to provide the fuel from the at least one fuel tank to the second heat exchanger, the fuel transfer circuit including at least one control valve configured in the fuel transfer circuit to selectively change a supply direction of the fuel from the second heat exchanger between the direction toward the tank and the direction toward the fuel supply circuit that is designed for the propulsion system,
wherein the air intake includes a blocking device configured to occupy a first open state of the air intake in which the blocking device allows the air flow to pass inside the cooling air channel and a second closed state in which the blocking device blocks the air intake to prohibit the air flow to pass inside the cooling air channel.

* * * * *